(12) United States Patent
Sanguinetti

(10) Patent No.: US 7,398,634 B2
(45) Date of Patent: Jul. 15, 2008

(54) WATTLE MANUFACTURING SYSTEM

(76) Inventor: Peter S. Sanguinetti, 903 Lucas Rd., Lodi, CA (US) 95242

( * ) Notice: Subject to any disclaimer, the term of this patent is extended or adjusted under 35 U.S.C. 154(b) by 0 days.

(21) Appl. No.: 11/784,200

(22) Filed: Apr. 4, 2007

(65) Prior Publication Data
US 2007/0252025 A1 Nov. 1, 2007

Related U.S. Application Data

(60) Provisional application No. 60/789,358, filed on Apr. 4, 2006.

(51) Int. Cl.
B65B 1/24 (2006.01)
B30B 1/06 (2006.01)
B30B 15/30 (2006.01)

(52) U.S. Cl. ............... 53/529; 53/530; 53/567; 53/576; 100/94; 100/100; 100/179; 100/188 R; 100/215

(58) Field of Classification Search ............ 53/525, 53/529, 530, 567, 576; 100/94, 100, 179, 100/188 R, 215, 240, 245
See application file for complete search history.

(56) References Cited

U.S. PATENT DOCUMENTS

| | | | | |
|---|---|---|---|---|
| 2,592,470 A * | 4/1952 | Ryberg | ............... | 156/501 |
| 3,274,926 A * | 9/1966 | Van Der Lely | ......... | 100/188 R |
| 3,650,298 A * | 3/1972 | Delmar | ............... | 138/103 |
| 5,154,543 A * | 10/1992 | Houck et al. | ............... | 405/303 |
| 5,392,591 A * | 2/1995 | Simpson | ............... | 53/435 |
| 5,519,985 A | 5/1996 | Dyck et al. | ............... | 53/527 |
| 6,109,835 A | 8/2000 | Grabhorn | ............... | 405/258 |
| 6,527,477 B1 | 3/2003 | Allard | ............... | 405/45 |
| 6,547,493 B2 | 4/2003 | Spangler et al. | ......... | 405/302.6 |
| 6,978,811 B1 * | 12/2005 | Meixelsperger et al. | ..... | 141/314 |
| 7,261,129 B2 * | 8/2007 | Koelker | ............... | 141/73 |
| 2003/0031511 A1 | 2/2003 | Tyler | ............... | 405/15 |
| 2004/0112811 A1 | 6/2004 | Lindemulder | ............... | 210/163 |
| 2005/0254899 A1 | 11/2005 | Tyler | ............... | 405/15 |

FOREIGN PATENT DOCUMENTS

JP 401021111 A 1/1989 ............... 405/115

* cited by examiner

Primary Examiner—Jimmy T Nguyen
(74) Attorney, Agent, or Firm—Stout, Uxa, Buyan & Mullins LLP; Linda A. Fox; Frank J. Uxa

(57) ABSTRACT

A wattle manufacturing system generally includes a hopper having an inlet for receiving a supply of straw, a loosening mechanism for loosening the straw when the straw is placed in or near the hopper inlet, a compaction chamber positioned to receive the loosened straw from the hopper, and a discharge conduit in communication with the compaction chamber. The discharge conduit may be in the form of a generally cylindrical tube, hereinafter sometimes referred to as an ejection tube, and generally includes a discharge end adapted to hold a netting material, for example a tubular shaped netting material, suitable to contain compacted straw. The netting material may be provided in a cartridge form which is structured to be coupled to the discharge end of the ejection tube.

13 Claims, 3 Drawing Sheets

WATTLE MANUFACTURING SYSTEM

This application claims the benefit of U.S. Provisional Patent Application No. 60/789,358, filed on Apr. 4, 2006, the entire disclosure of which is incorporated herein by this specific reference.

The present invention generally relates to manufacturing equipment and more specifically relates to equipment for manufacturing straw-filled tubes for filtering and/or controlling water flow in or around construction sites and the like.

The present apparatus described herein utilizes straw, for example, raw straw that is a byproduct of the agricultural activities, for example, wheat straw, rice straw and the like and combinations thereof, and processes the straw into a generally cylindrical, confined and compacted form. These cylindrical forms are commonly referred to in the industry as "wattle".

Wattle are used for various purposes in the construction industry, for example, for promoting or enhancing stabilization of soil and as means for reducing potentially destructive effects of water runoff. Wattle can also be effectively used to provide filtering of sediment and debris in runoff water in and around construction sites or the like.

Dyck et al, U.S. Pat. No. 5,519,985, is incorporated herein in its entirety by this reference.

SUMMARY OF THE INVENTION

An effective, easy to use wattle manufacturing system is provided. The system generally comprises a hopper having an inlet for receiving a supply of straw, a loosening mechanism for loosening the straw when the straw is placed in or near the hopper inlet, a compaction chamber positioned to receive the loosened straw from the hopper, and a discharge conduit in communication with the compaction chamber. The discharge conduit may be in the form of a generally cylindrical tube, hereinafter sometimes referred to as an ejection tube, and generally includes a discharge end adapted to hold a netting material, for example a tubular shaped netting material, suitable to contain compacted straw. The netting material may be provided in a cartridge form which is structured to be coupled to the discharge end of the ejection tube.

The system may further comprise a compactor mechanism. The compactor mechanism preferably includes a ram-like hydraulically driven piston. The compactor mechanism is positioned at or near the ejection tube. The piston moves in a generally longitudinal direction at least partially within the ejection tube and in a manner effective to compact the loosened straw as the straw enters the compaction chamber. The compactor mechanism is further effective to force the straw through the ejection tube toward the discharge end. Once at the discharge end, the compacted straw encounters and becomes contained by the tubular shaped netting material. The compacted straw contained by the netting material continues to increase in length until a desired length of straw-filled tube, or wattle, is reached.

Preferably, the loosening mechanism comprises one or more moving finger elements mounted at, or otherwise operationally positioned near, the hopper inlet. The one or more finger elements are structured to effectively loosen a supply of straw as the straw is fed into the hopper. The finger elements may comprise at least two generally opposing finger elements which are driven by rotating wheels or other means which move the fingers toward and away from one another, preferably in an alternating fashion.

Advantageously, the entire wattle manufacturing system may be structured to be transportable, for example, by means of a wheeled trailer. Advantageously, in this embodiment, wattle may be manufactured on site, for example, at the site it will be put to use in erosion control, as needed.

Any and all features described herein and combinations of such features are included within the scope of the present invention provided that the features of any such combination are not mutually inconsistent.

These and other features, aspects and advantages of the present invention will become apparent hereinafter, particularly when considered in conjunction with the following claims, detailed description and drawings in which like parts bear like reference numerals.

BRIEF DESCRIPTION OF THE DRAWINGS

Each of FIGS. 1 and 2 is a schematic representation of a side viewing of an embodiment of the invention.

DETAILED DESCRIPTION

Figure 1:
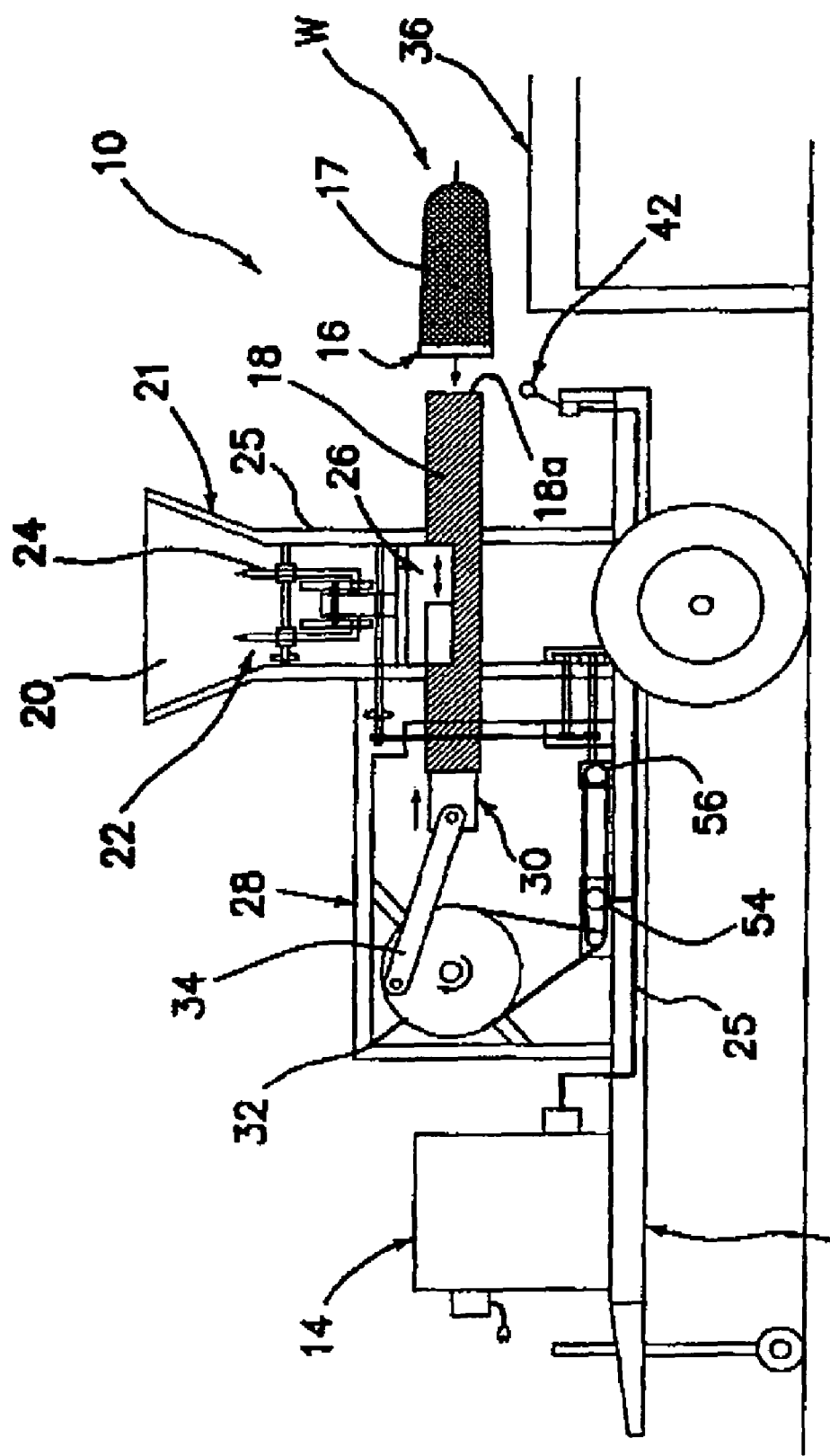

Turning now to the Figures, a wattle manufacturing system in accordance with the invention is shown generally at 10. As will be described hereinafter, the system 10 generally comprises a structure which may be easily transported and may be substantially entirely self contained in that it can be used to manufacture wattle on site, for example, at a site where the wattle is put to use.

A wheeled trailer 12 may be a component of, or an accessory to the system 10, and may be used to mount all of the components of the system 10. The system may include a power unit 14, for example, a hydraulic power unit effective to activate and drive the system 10 in the manufacture of wattle from straw, for example, raw, substantially unprocessed, natural straw, processed straw, or other filling material. The power unit 14 is preferably a self-contained electrically powered unit comprising, for example, an electric switch, a hydraulic pump driven by an electric motor, a reservoir of hydraulic fluid, and ports to connect hydraulic lines 15 to the hydraulic power unit 14. A cartridge 16 loaded with netting material, for example, a generally tubular netting material 17, or other suitable material for containing compacted straw, is slidably mounted to a discharge conduit, or an ejection tube 18.

When the system 10 is in use, a filling material, for example straw, is fed into a mouth 20 of a hopper 21 where a loosening mechanism 22, which comprises, for example, opposing moving fingers 24, are effective to loosen and transport the straw into a chamber chute 25 which leads to a compaction chamber 26.

A compactor mechanism 28, including, for example, a ram or ram-like device, for example, a piston 30, is effective to compact and push the straw as the straw enters the compaction chamber 26. The motion of the piston 30 causes straw to move from the compaction chamber 26 and toward and into the ejection tube 18. The compactor piston 30 may be driven in any suitable manner, for example, by a rotating wheel 32 and arm 34 as shown, or other suitable drive mechanism.

As straw, for example, loosened straw, is fed into the hopper 21, compacted straw is forced into the ejection tube 18 and toward a discharge end 18a thereof, where a leading end of a compacted straw column encounters the material 17, for example, a closed or sealed end of the cartridge-mounted tubular netting material 17, for example, a substantially sealed end, of a material 17 on the cartridge 16. Such tubular netting material and cartridges containing same are commercially available. As the compacted straw contained by the material 17 is forced out from the discharge end 18*a* of the ejection tube 18 and grows in length, it may be supported by a support table 36. The compacted, contained straw product, or wattle W, grows in length until the end of the material 17 slides off the cartridge 16 and the system 10 is stopped, for example by means of control lever 42. A back, open end of the wattle W may be tied or otherwise sealed or closed, thus completing the wattle product.

Figure 2:
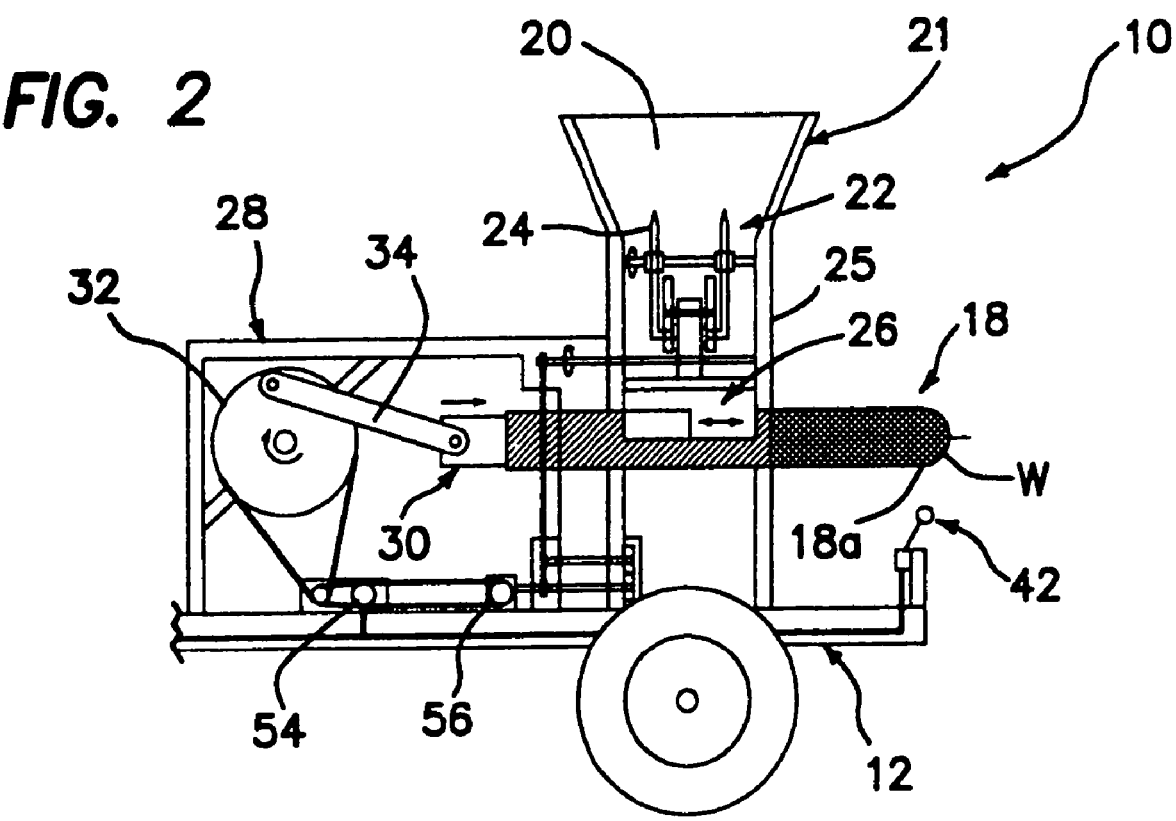

FIG. 2 shows a partial side view of the system 10 shown in FIG. 1 showing wattle W as it is just beginning to form at the discharge end 18*a* of the ejection tube 18.

Figure 3:
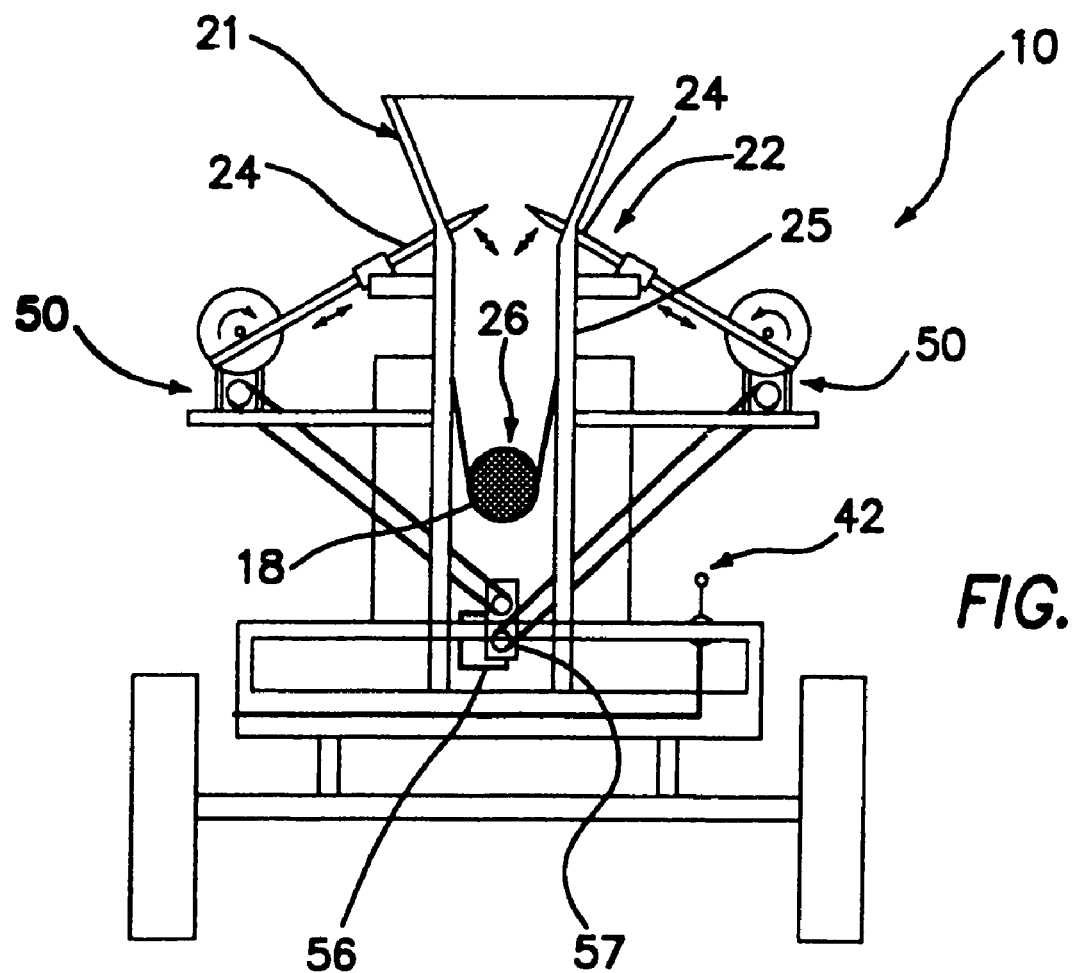
FIG. 3 is a schematic representation of an end view of the embodiment shown in FIGS. 1 and 2.

FIG. 3 shows an end view of the system 10 and particularly how the finger elements 24 of the loosening mechanism 22 move, for example, in response to rotation of wheels 50, to loosen and/or pull straw (not shown) fed into the hopper 21 and chute 25.

In a more specific aspect of the invention, the control lever 42 may be operable to take hydraulic fluid from the power unit 14 and direct it to a hydraulic motor 54 which drives all or substantially all of the moving parts of the system 10. In one advantageous embodiment, the hydraulic motor 54 simultaneously drives the piston 30, for example, by means of drive wheel 32, and the finger elements 24, for example, by means of a gearbox 56.

In another specific aspect of the invention, the piston drive wheel 32 is effective to drive the compactor piston 30 in a longitudinal or axial direction such that the piston 30 at least partially projects into the ejection tube 18. Preferably, the compactor piston 30 retracts away from the opening of the chamber 26 far enough to allow straw to enter the compaction chamber 26 from the chute 25. Once in the compaction chamber 26, the straw is then forced forwardly toward the ejection end 18*a* through the ejection tube 18 and into the prepared cartridge 16 to form the wattle W.

As shown most clearly in FIG. 3, the moving fingers gearbox 56 changes the shaft rotation angle ninety (90) degrees and drives a reverse rotation gearbox 57 and one of the finger drive wheels 50. The output of the reverse rotation gearbox 57 drives the other drive wheel 50. Preferably, the motion of each of the moving fingers 24 is set for alternating motion or in a suitable manner such that the fingers 24 do not collide with each other nor interfere with the compactor piston 30.

While this invention has been described with respect to various specific examples and embodiments, it is to be understood that the invention is not limited thereto and that it can be variously practiced.

What is claimed is:

1. A wattle manufacturing system comprising:
   a hopper having an inlet and an outlet;
   a loosening mechanism disposed at least partially in the hopper and positioned and structured to be effective in loosening straw placed in or near the hopper inlet, the loosening mechanism including a first finger element positioned at one side of the hopper and a second finger element positioned at a side opposite to the one side of the hopper, the first finger element being movable relative to the second finger element each of the first and second finger elements having one end disposed in the hopper for loosening straw and an opposing end disposed outside of the hopper, both of the opposing ends being connected to a finger drive mechanism;
   a compaction chamber positioned to receive loosened straw directly from the hopper outlet and including a compactor mechanism positioned and structured to be effective in compacting the loosened straw;
   a discharge conduit in communication with the compaction chamber and including a discharge end adapted to hold a containment material effective to contain compacted straw discharged through the discharge end; and
   the compactor mechanism positioned and structured to be effective in moving compacted straw from the compaction chamber toward the discharge end of the discharge conduit and into the containment material to form a compacted, straw-filled product.

2. The system of claim 1 wherein the finger drive mechanism is effective to move the first finger element and the second finger element in a generally alternating motion.

3. The system of claim 2 wherein the finger drive mechanism comprises a first rotatable element coupled to the first finger element, and a second, separate rotatable element coupled to the second finger element.

4. The system of claim 1 wherein the compactor mechanism is hydraulically driven.

5. The system of claim 1 wherein the system is transportable by means of a wheeled trailer.

6. The system of claim 2 further comprising a motor which is structured and positioned to drive both the compactor mechanism and the finger drive mechanism.

7. The system of claim 2 wherein the finger drive mechanism is effective to move the one end of the first finger element and the one end of the second finger element generally toward and away from one another in an alternating motion.

8. The system of claim 3 wherein the finger drive mechanism further includes a third rotatable element effective to move the first and second rotatable elements.

9. The system of claim 1 wherein the finger drive mechanism includes a first rotatable element coupled to the first finger element, a second rotatable element coupled to the second finger element, and a third rotatable element structured and positioned to be effective to rotate both of the first and second rotatable elements.

10. The system of claim 1 wherein the finger drive mechanism is structured and positioned to be effective to move the first finger element and the second finger element generally toward and away from one another.

11. The system of claim 10 wherein the loosening mechanism further comprises a first rotatable element coupled to the first finger element and a second, separate rotatable element coupled to the second finger element.

12. The system of claim 9 further comprising a motor structured and positioned to be effective to drive rotation of the third rotatable element.

13. A method of making a straw-filled, erosion control wattle product, the method comprising the steps of:
    providing a hopper having an inlet and an outlet;
    providing a loosening mechanism disposed at least partially in the hopper and including a first moveable finger element, a second moveable finger element, and a finger drive mechanism structured and effective to move the first and second finger elements generally toward and away from one another within the hopper, the first moveable finger element is positioned at one side of the hopper and the second moveable finger element is positioned at a side opposite to the one side of the hopper, the first moveable finger element being movable relative to the second moveable finger element, each of the first and second moveable finger elements having one end disposed in the hopper for loosening straw and an opposing end disposed outside of the hopper, both of the opposing ends being connected to the finger drive mechanism;

providing a compaction chamber adjacent the outlet of the hopper;

providing a containment material;

providing a discharge conduit in communication with the compaction chamber and including a discharge end for holding the containment material;

placing a supply of straw in the hopper inlet and in contact with the first and second finger elements to cause the straw to be loosened by the loosening mechanism and allowing the loosened straw to move through the hopper outlet and into the compaction chamber;

mechanically compacting the loosened straw in the compact ion chamber;

mechanically pushing the compacted straw in the compaction chamber into the containment material; and containing the compacted straw in the containment material to form a compacted, strawfilled wattle product.

\* \* \* \* \*